Figure 1:
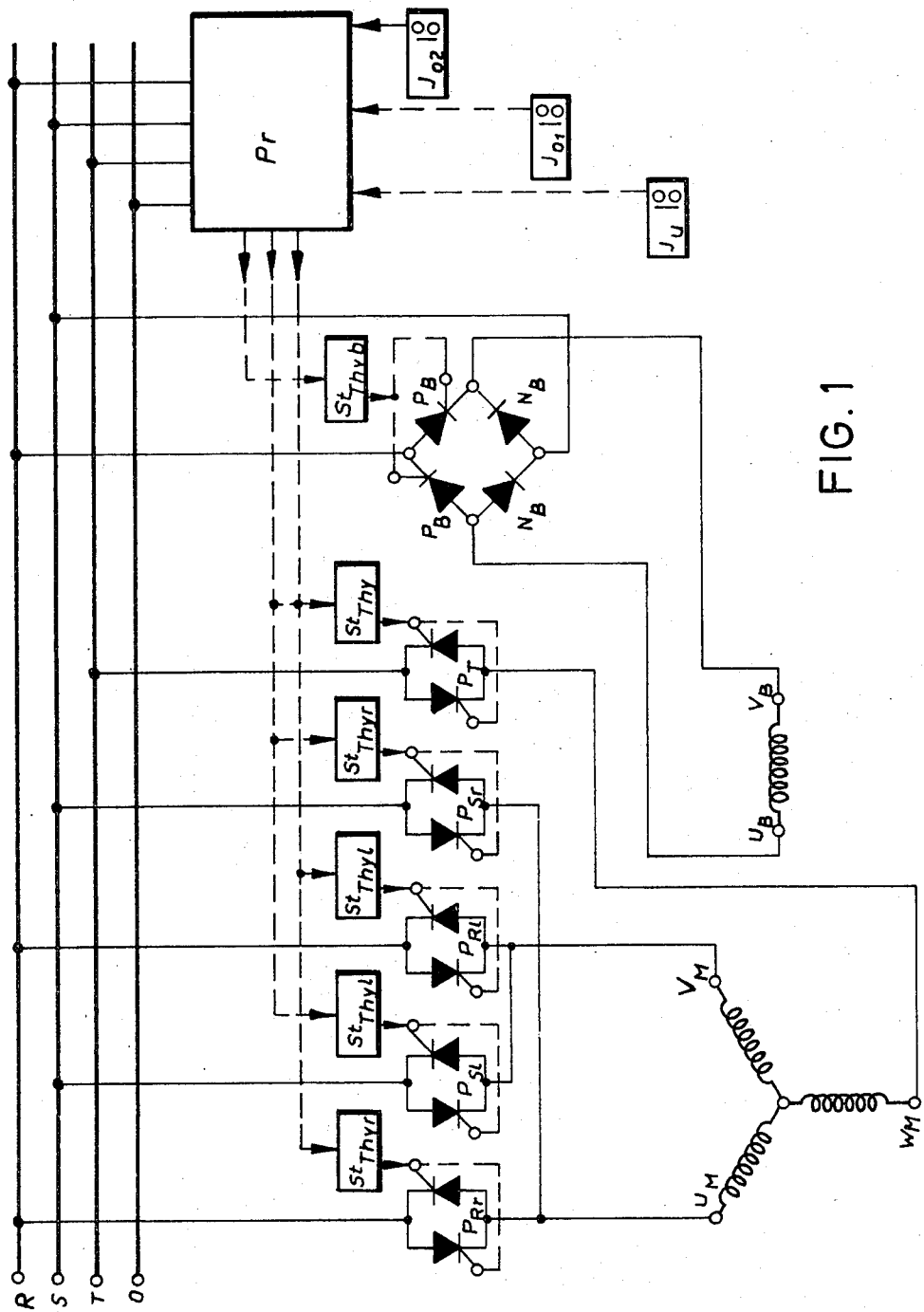

United States Patent [19]
Dorr et al.

[11] 3,819,993
[45] June 25, 1974

[54] MOTOR CONTROL SYSTEM AND METHOD FOR FAST SPINDLE TYPE IMPACT PRESSES

[76] Inventors: Walter Dorr, Habrechtstrabe 14, 71 Heilbronn/Neckar; Hermann K. A. Glaser, 6522 Osthofen via Worms, both of Germany

[22] Filed: Nov. 30, 1971

[21] Appl. No.: 203,218

Related U.S. Application Data
[63] Continuation-in-part of Ser. No. 884,698, Dec. 12, 1969, abandoned.

[30] Foreign Application Priority Data
Dec. 12, 1968 Germany.................... 1814374

[52] U.S. Cl. ............................................. 318/203
[51] Int. Cl. ............................................. H02p 1/40
[58] Field of Search ............ 318/203, 209, 211, 227

[56] References Cited
UNITED STATES PATENTS

| | | |
|---|---|---|
| 3,353,077 | 11/1967 | Egglestone et al.............. 318/227 X |
| 3,461,369 | 8/1969 | Bonikowski et al. ............... 318/227 |
| 3,596,156 | 7/1971 | Davey............................ 318/203 R |

*Primary Examiner*—Gene Z. Rubinson
*Attorney, Agent, or Firm*—Fleit, Gipple & Jacobson

[57] ABSTRACT

In a motor controlled fast spindle type impact press a motor controlling system, the motor being preferably of the umbrella construction type and being provided with a main motor winding and a retarding winding respectively, the motor windings being connected to an electric power supply (e.g., mains supply) via controlled thyristors for both running directions of the motor and the retarding windings being connected to the electric power supply via rectifier bridges, controlled by thyristors whereby adjustment of the motor moments and retarding moments results in a precisely defined impact force together with a shortest possible impact time.

11 Claims, 8 Drawing Figures

FIG. 4

MOTOR CONTROL SYSTEM AND METHOD FOR FAST SPINDLE TYPE IMPACT PRESSES

This application is a continuation-in-part of application Ser. No. 884,698, filed Dec. 12, 1969, for Motor Control System, now abandoned.

The present invention concerns a motor controlling device for fast running spindle type impact presses which preferably are equipped with motors of the umbrella construction type. That is, motors which are positioned above their respective presses and directly coupled to the spindles thereof.

As a consequence of increasing automation faster impact rates with spindle type presses are demanded. This is why with modern fast presses the friction drive has been dispensed with and slowly running motors of the umbrella construction type are mounted directly above the press, the elongated motor shaft being formed and serving as the spindle of the press.

Additionally, recently in connection with spindle type impact presses, a precise magnitude of the impact force is demanded. This renders it possible to increase the life of the tools. Moreover in the most cases impacts with different impact forces have to be carried out during one working cycle, whereby the impact forces are adjusted by a present program acting on the control device of the press.

With a known embodiment of a press of this type the magnitude of the impact force is obtained by switching off the motor when the ram has reached a certain velocity or has covered a certain distance. Moreover circuit arrangements had been realized according to which two antiparallel thyristors are connected with a motor feed line and are controlled according to the desired impact force.

With these driving devices, particularly with the latter mentioned, a substantially satisfactory magnitude of the impact force can be obtained. These controlling systems, however, in any case require a reduction of the impact rate of the press.

The motors of the presses realized hitherto are switched by contactor equipment. This however is disadvantageous insofar as the contactors, because of their relatively great inertia, are too slow for the rapid changes in program relating to the controlling of the impact force. Moreover the switching times of the contactors cannot be regarded as being constant. Particularly in connection with the first described type of a controlling device the differences in the switching times of the contactors influence the impact force of the press in such a way that the accuracy of this controlling device largely depends on the differences in the switching times of the contactors.

The main object of the present invention is therefore to eliminate these difficulties and to provide a driving device by which a precisely adjusted impact force, together with a predetermined impact time, can be obtained.

This problem is solved by a motor controlling device of the type described above with which according to the present invention the motor is provided with main motor windings and a retarding, or braking, winding, and that for adjusting the impact force the main windings of the motor for both running directions, via controlled thyristors or the like and the retarding windings via a rectifier bridge controlled by thyristors, are connected to the main supply so that by adjusting the motor and retarding torques an exact defined impact force together with a predetermined impact time can be obtained. With the driving device according to the present invention therefore the motors no longer are controlled by contactors but exclusively by thyristors. Immediately before the impact of the ram the motors additionally are retarded by known eddy-current braking corresponding to the required impact energy. In the motor controlling device according to the present invention three advantages are inherent:

1. The impact forces can be varied by a preset phase adjustment of the thyristors and can be controlled thereby in a most exact manner.
2. The impact rates can be increased essentially by using the eddy-current braking immediately before the impact of the ram.
3. Influences of temperature, voltage and the like upon the impact force can be eliminated by suitable compensation circuits.

Figure 2:
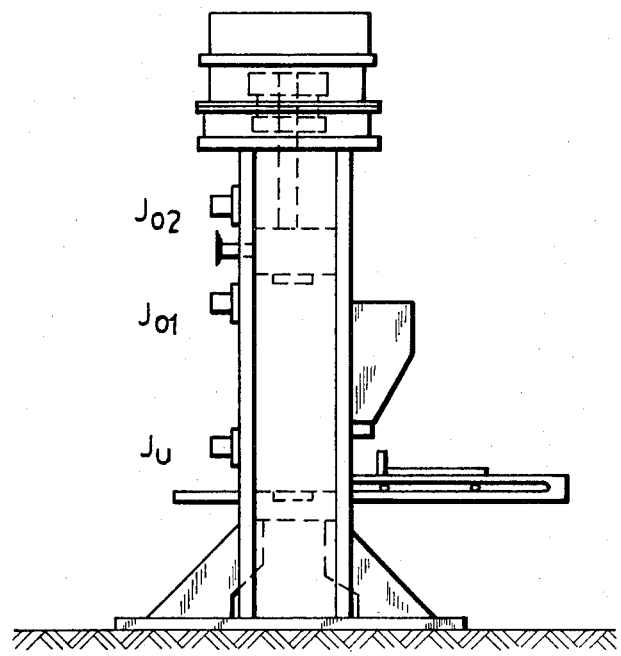
Figure 3:
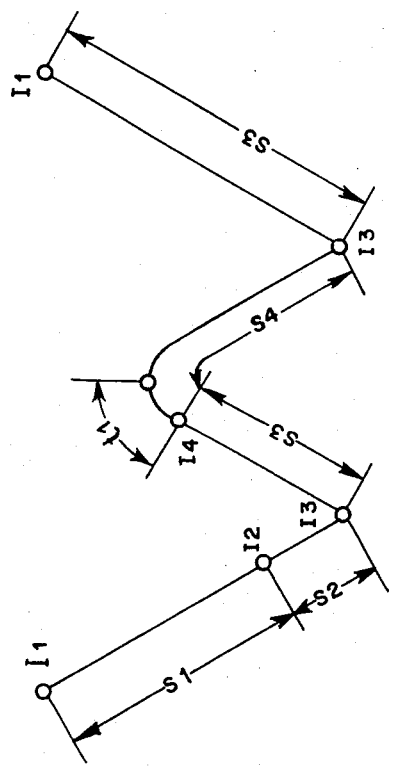
Figure 4C:
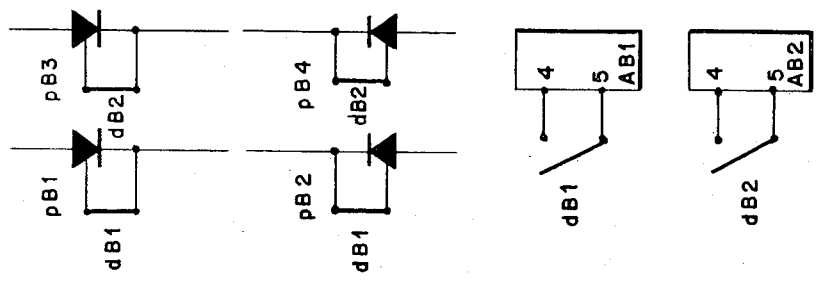
Figure 4A:
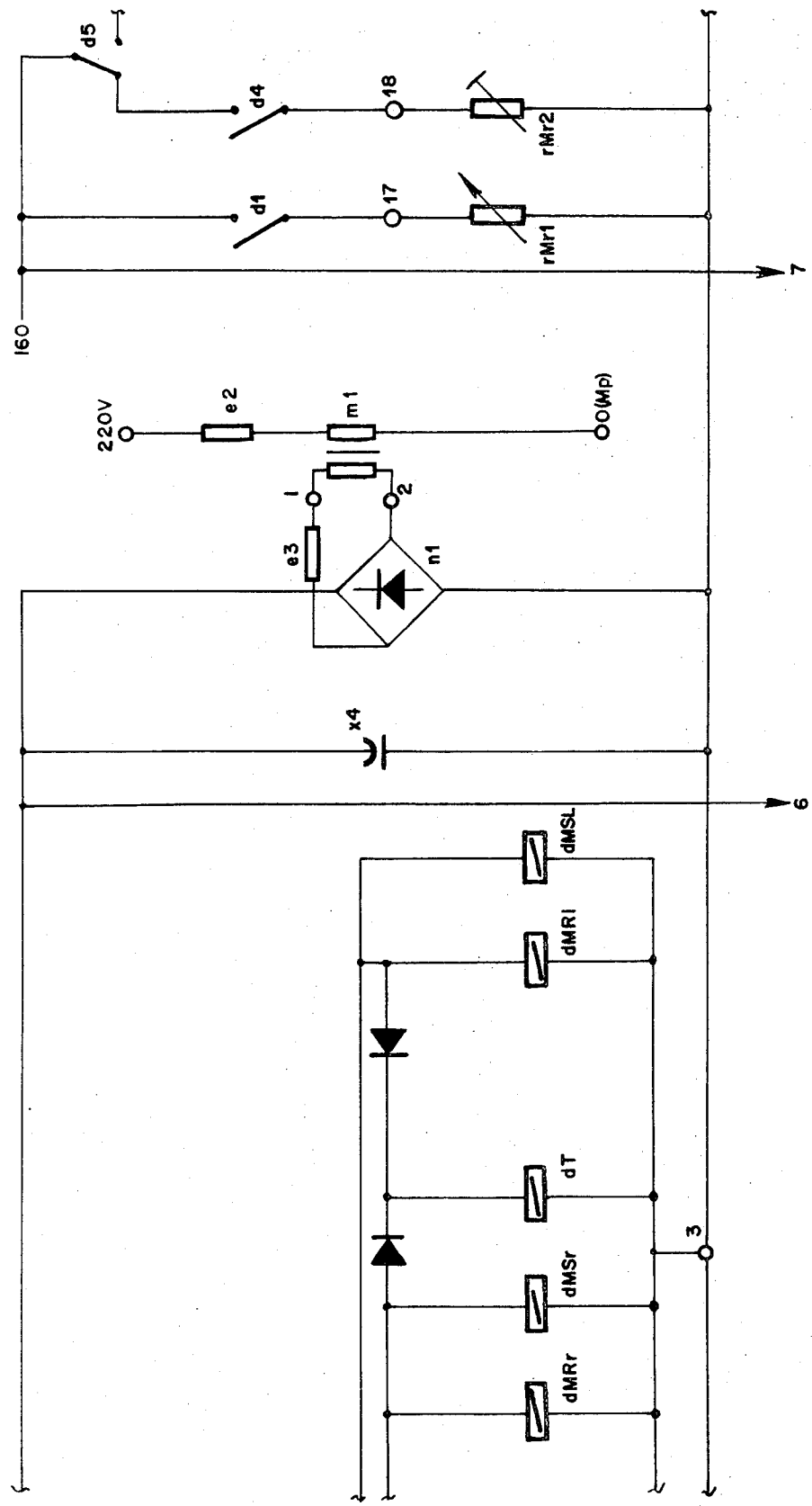
Figure 4B:
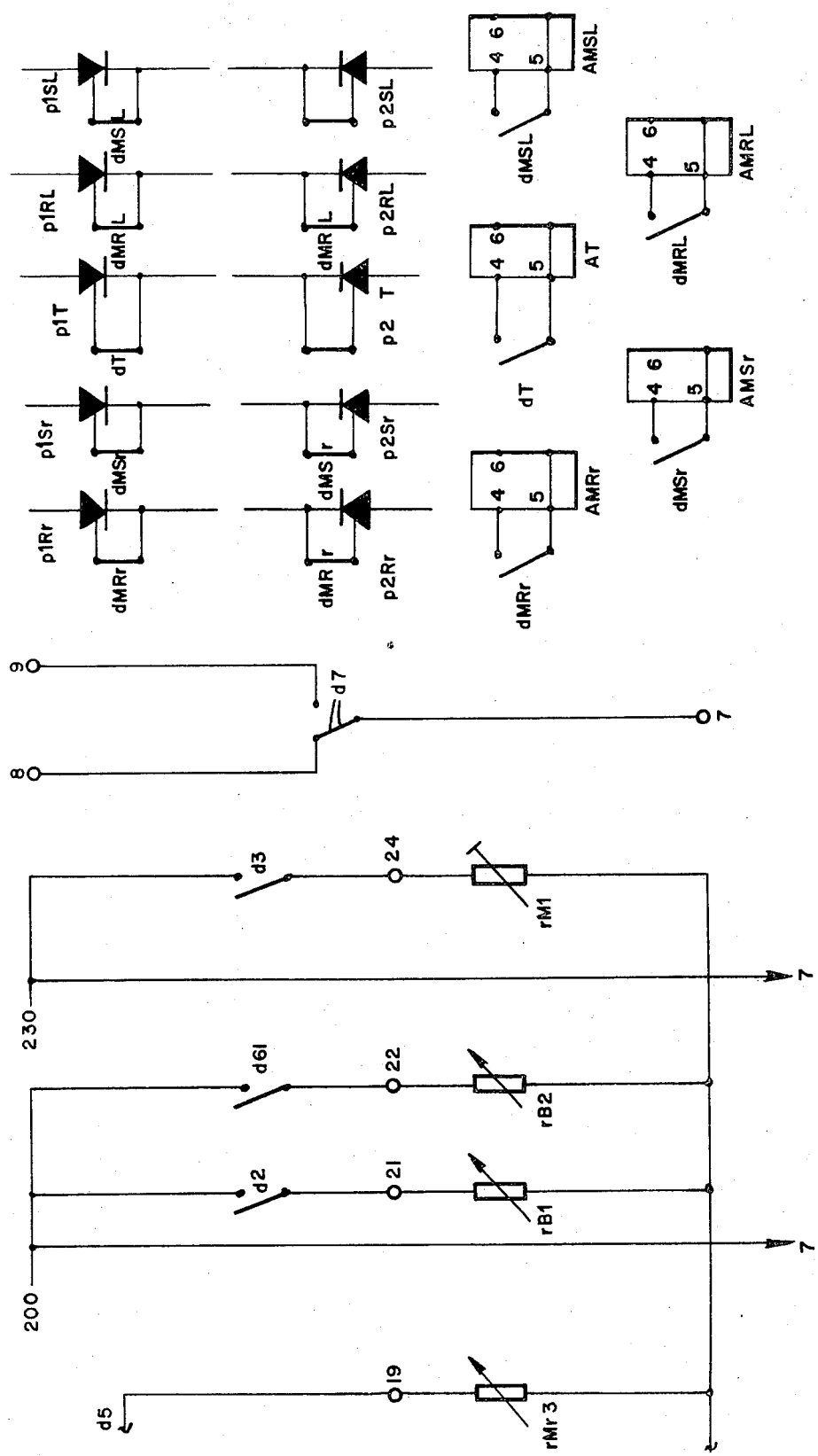
Figure 5:
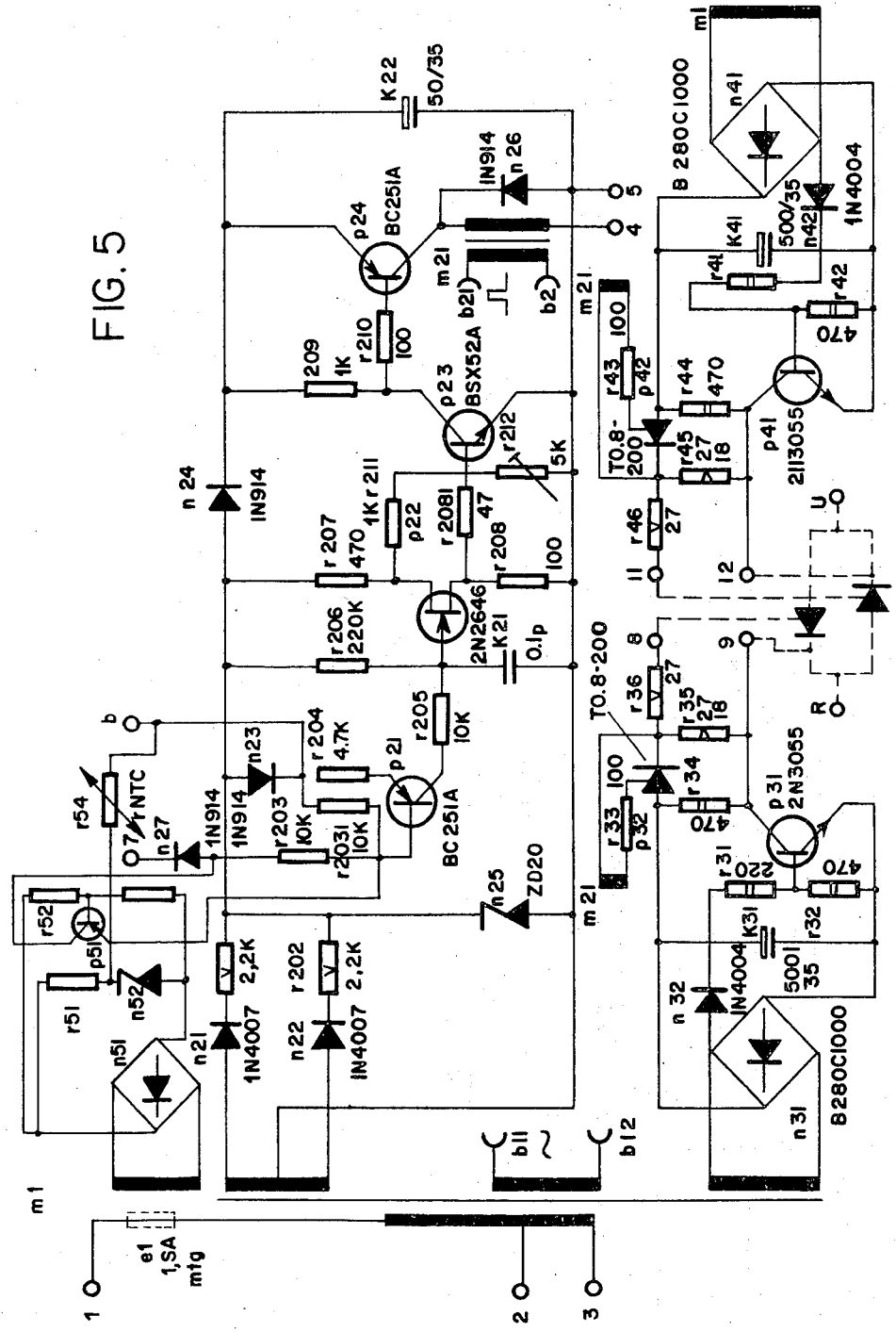

In the following specification the invention will be explained more in detail in connection with the drawings. The drawings show in:

FIG. 1 is a wiring diagram of the controlling device according to the invention;

FIG. 2 diagrammatically the arrangement of control switches at a spindle type impact press;

FIG. 3 is a flow chart for a two-impact program of a spindle type impact press;

Figure 4:
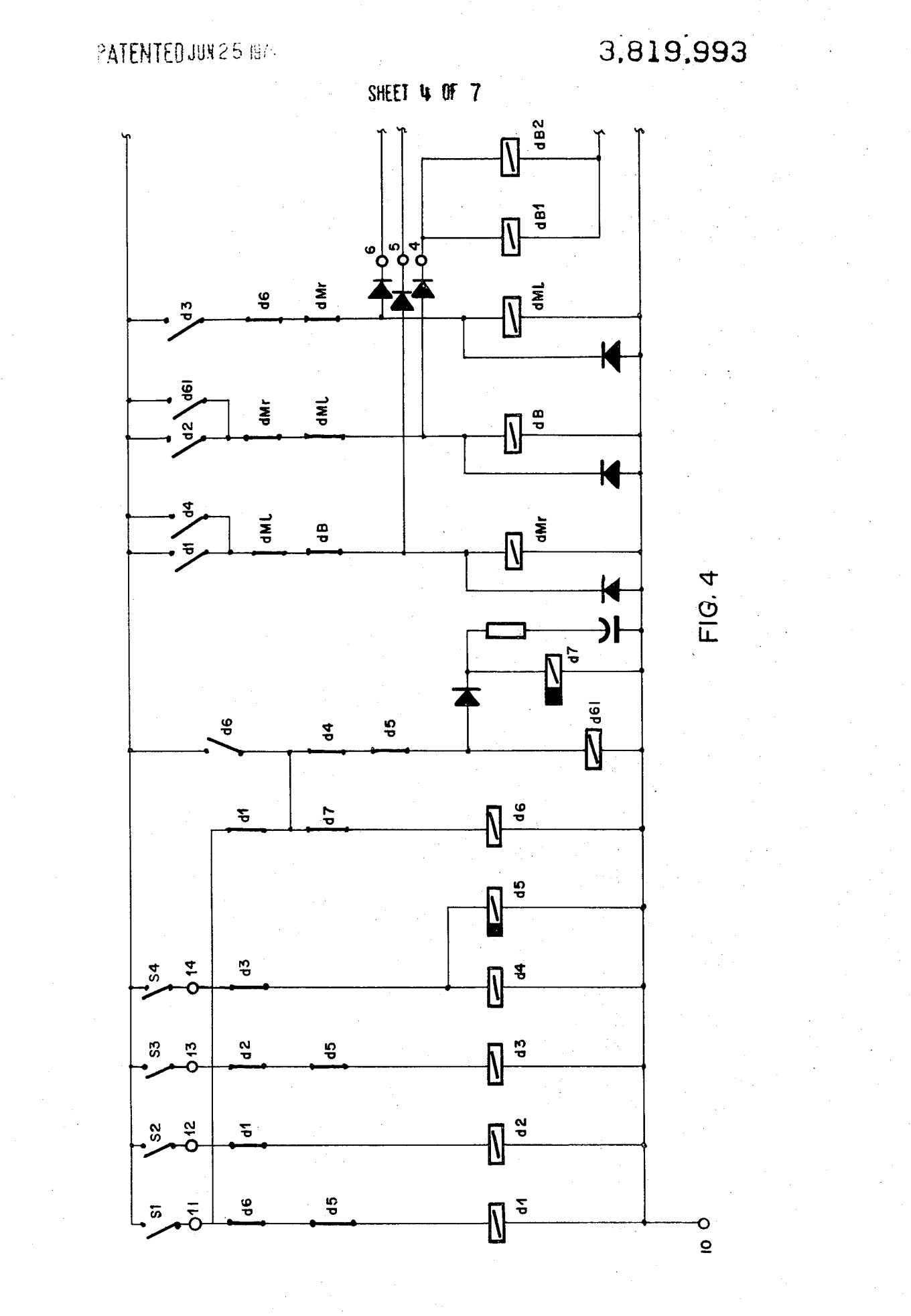

FIG. 4, 4A, 4B, and 4C together show a schematic diagram of the programmer Pr; and FIG. 5 is a schematic diagram of controlling instruments $St_{Thur}$, $St_{Thul}$.

R, S, T are the three phases of the main supply. $P_{Rr}$, $P_{Sr}$ are two pairs of thyristors of the R-phase and the S-phase for one running direction (to the right hand) of the motor whereas $P_{Rl}$, $P_{Sl}$ are the corresponding pairs of thyristors for the opposed running direction (to the left hand) of the motor. The pair of thyristors of the T-phase is designated $P_T$. U, V, W is the three-phase winding of the motor, $P_B$ and $N_B$ is a semicontrolled rectifier bridge and $U_B$, $V_B$ the one phase retarding winding of the motor. $St_{Thur}$ and $St_{Thul}$ are controlling instruments for the thyristors which govern the running direction (to the right and to the left) of the motor. They include the compensation circuits compensating for temperature, voltage and other influences, and are in detail shown in FIG. 5. Finally, by Pr the preset program of the press by $J_U$, $J_{01}$ and $J_{02}$ switches are designated which are arranged on the press frame and which influence the preset program controlling in a passlength dependent manner.

In FIG. 2 the arrangement of these swtiches is shown schematically.

In the following the function of the controlling device will be explained in detail in connection with a preset working cycle including three impacts. Such a cycle for instance is required in connection with ceramic industries when the moldable material is to have air removed by a soft impact, subsequently precompressed by a stronger impact and finally pressed with full impact energy into the desired form. Of course, the present invention is equally applicable to working cycles of other than three impacts.

At the beginning of the cycle the ram is positioned slightly above switch $J_{01}$. Now the thyristors for the downward direction (for instance to the right hand) are fired with a defined phase control. Consequently the ram is accelerated in an exact defined manner downwards. When the ram passes the switch $J_U$, the thyristors for the right direction are blocked and the retarding thyristors are fired with a defined control. The ram now is retarded in a defined manner and impacts upon the molding material with the desired impact energy. Switch $J_U$ further switches on a timing element which blocks the retarding thyristors after a defined time interval and fires the thyristors for the left running direction (upwards) at the full controlling angle. The ram now is returned with the maximum possible acceleration upwards until it passes switch $J_{01}$. Now the thyristors for the left running direction are disengaged and the retarding thyristors are fired again. At the same time a timing element is switched on which effects disengagement of the retarding thyristors and causes firing of the thyristors for the right running direction after a defined time interval. Consequently the ram reverses its running direction in its original position and again accelerates downwards until it is again retarded after passing switch $J_U$ and then the timing element for stopping the retardation and for commencing the return movement of the ram is switched on. It is of course possible to preset the controlling angles of the motor and retarding thyristors to another value for the second impact than for the first impact so that the impact forces can easily be adapted to the requirements of the pressing process. After the time interval controlled by the timing element the thyristors for the returning movement of the ram are fired at the full control angle so that the ram returns with the maximum possible acceleration upwards until it reaches switch $J_{02}$. In like manner as initiator $J_{01}$, switch $J_{02}$ effects the blocking of the thyristors for the upward direction and the firing of the retarding thyristors. Additionally the switching on of a timing element for disengagement of the retarding thyristors and for firing the thyristors for the right running direction after a defined time interval is effected. The ram therefore at a position defined by switch $J_{02}$ reverses its moving direction and now performs, determined by controlling angle and pass-length, its third impact of a precisely defined impact energy. As in most cases when a substantial impact is required the ram is not retarded electrically when reaching switch $J_U$ for this phase of the operation. Instead, switch $J_U$ effects switching off the motor running to the right direction and switching on via the timing element the motor to run to the left direction. Consequently the ram is returned in its original position. It is possible of course to preset a further impact with a desired impact force. It is moveover possible to vary the preset program in any desired way so that practically every problem occurring can be solved optimally. Naturally for the controlling device according to the invention motors of the conventional construction type can be used.

As previously stated, the present invention is applicable to any desired number of impacts, and FIGS. 3–5 illustrate specific circuitry relating to a two-impact program of programmer Pr.

As illustrated in FIG. 3, $I_1$, $I_2$, $I_3$, and $I_4$ are control switches which have been grouped on the press frame. They correspond to the control switches $J_U$, $J_{01}$, and $J_{02}$ of FIGS. 1 and 2.

When an indicator flag, which has been attached to the press ram is located within the range of control switch $I_1$, the signal $S_1$ is produced, by which the relay $d_1$ will be actuated this is best seen when reference is made to FIGS. 4, 4A and 4B. $d_1$ actuates the relay $dMr$ and, at the same time, the relays $dMRr$, $dMSr$, and $dT$.

$dMRr$, $dMSr$, and $dT$, in turn, switch on the three control devices AMRr, AMSr, and AT, and the grid-cathode short circuits of the thyristors $p1Rr$, $p1SR$, and $p1T$, as well as of $p2R$, $p2Sr$, and $p2T$ will be canceled. In addition, the resistance $rMr1$ is connected by the relay $d_1$ to the terminals 6 and 7 of the control devices AMRr, AMSr, and AT, while the relays $dB$, $dM1$, $dB1$, $dB2$, $dMR1$ and $dMS1$ are blocked by the relay $dMRr$. By means of the resistance $rMr1$ — depending on its size — a certain angle of control is set for the thyristors $p1Rr$, $p1Sr$, $p1T$, $p2Rr$, $p2Sr$, and $p2T$, so that the motor, while the revolving field is rotating clockwise, will receive a certain voltage and the press ram will move downwardly accordingly, with a certain defined acceleration which may be set on $rMr1$.

When the indicator flag on the press ram moves into the range of control switch $I_2$, signal $S_1$ will disappear, and signal $S_2$ will appear. In consequence thereof, relay $d1$ will drop first, and in consequence thereof, the relays dMr, dMRr, dMSr, and $dT$ will also drop. Thereby, the control devices AMRr, AMSr, and AT will be cut off, and the grid-cathode paths of the thyristors $p1Rr$, $p1Sr$, $p1T$, $p2Rr$, $p2Sr$, and $p2T$ will be short-circuited.

After the dropping of relay $d1$, relay $d2$ will be able to pull up, and that will bring about the pulling-up of relays $dB$, $dB1$, and $dB2$. While the two control devices AB1 and AB2 are switched on by the relays $dB1$ and $dB2$ and the grid-cathode circuits of the thyristors $pB1$, $pB2$, $pB3$, and $pB4$ are canceled, the resistance $rB1$ will be connected with terminals 6 and 7 of the control devices AB1 and AB2. Depending on the magnitude of $rB1$, a certain angle of control of the control devices AB1 and AB2 will be set and therefrom, the direct voltage required for the braking of the motor will result. The braking action will be carried out with a force that is exactly sufficient to have the press ram strike the material to be pressed at the desired velocity and, therefore, with the desired energy content.

The control switch $I_3$, which has been placed, practically, at the bottom dead center of the ramming motion, causes the signal $S_2$ to disappear and the signal $S_3$ to appear, when the indicator flag moves into its range. In a manner that is analogous to the one described above, that causes the relays $d2$, $d3$, $dB1$ and $dB2$ to drop, and thereafter, the relays $d_3$, $dM1$, $dMR1$, $dMS1$, and $dT$ will pull up. In consequence thereof, the thyristors $pB_1$, $pB_2$, $pB_3$, and $pB_4$ will be cut off, as well as the control devices $AB_1$ and $AB_2$, and the thyristors $p_1R1$, $p_2S1$, $p_1T$, $p_2R1$, $p_2S1$, $p_2T$, as well as the control devices AMR1, AMS1, and AT will be switched on, for the upward movement of the ram. The magnitude of the momentum of the motor can be adjusted by the resistance $rM1$.

During the further course of the movement of the ram, the indicator flag on the press ram will enter into the range of the control switch $I_4$. In consequence thereof, signal $S_3$ will be canceled, and signal $S_4$ will appear. As already described for the preceding operations, the relays $d_3$, $dM1$, $dMR1$, $dMS1$ and $dT$ will drop in consequence thereof, so that the motor momentum that drives the ram during its upward movement, will disappear. Now, the relays $d4$, $dMr$, $dMRr$, $dMSr$, and $dT$ will be able to pull up, followed after an adjustable period of time by the time-lag relay $d5$. The resistance $rmr2$, which has a large angle of control and, in consequence thereof, generates a great motor momentum, is connected by means of $d4$ with the associated control devices. That means that the motor is braked strongly by means of a reversed current. After the time relay $d5$ has pulled up, the motor momentum will be reduced to a value that can be set on $rMr3$, so that the press ram will now be driven forward with a well-defined acceleration in order to have the desired kinetic energy when it strikes the material to be pressed.

Now, control device $I_3$ causes the signal $S_4$ to disappear, and the, already known, signal 3 will appear, until signal S1 appears again, upon initiation by control switch I4. Now, the relay $d6$ will immediately pull on, by means of the interlocking device selected, while relays $d4$ and $d5$ will drop.

Following the dropping of relays $d4$ and $d5$, relay $d61$ will be able to pull on, followed after an adjustable period of time by the time-lag relay $d7$. As soon as relay $d7$ pulls up, it interrupts the current for relay $d6$, and relays $d6$, $d61$, and $d7$ will drop. Now relay $d1$ will be able to pull up, and the cycle can begin anew.

It remains to be said that relay $d61$ causes the relays $dB$, $dB1$, and $dB2$ to pull up, and that, thereby, the thyristors for braking, $pB1$, $pB2$, $pB3$ and $pB4$ will be switched on. The force of the brake torque of the motor may be adjusted on the resistance $rB2$.

FIG. 5 illustrates a specific example of a compensation circuit utilized with the present invention for compensating for temperature, voltage, and other influences.

By means of the power transformer $m1$, of the diodes $n21$ and $n22$, of the resistances $r201$ and $r202$, as well as of the breakdown diode $n25$ a trapeziform supply current of twice the line frequency is generated for the impulse generator. The control voltage on terminals 6/7 switches the transistor $p21$ on, which is located, as a variable resistance, within the charging cycle of the condenser K21. When the voltage on K21 is equal to the breakdown voltage of the unijunction transistor $p22$, that transistor will break down and the condenser K21 will discharge very rapidly by way of the resistance $r208$. The impulse originating in that way will be amplified by the succeeding amplifier stage that consists of the transistors $p23$ and $p24$, and will be transferred onto the two two-impulse-shaper stages, by way of the impulse repeater or transmitter $m21$. At the end of each period of the trapeziform voltage, the transistor $p22$ will become, in any case, permeable due to the reduction of the supply voltage, so that, in any case, the condenser $p21$ will be discharged at the beginning of a new period. The charging time of the condenser K21 as determined by $p21$ will determine the angle of ignition of the thyristors.

It has become apparent through experience that it is very advantageous, especially in the case of operation by three-phase-current to have the thyristors ignited not by means of ignition impulses but rather by an ignition current that will flow for the remainder of the half cycle following ignition. The two impulse shaper stages serve that purpose. The control grids of the two anti-parallel main thyristors have been connected with the terminals 11 and 8, while the two cathodes have been connected with the terminals 9 and 12 of the impulse shaper stages. Because of the two diodes $n32$ and $n42$, the two transistors $p31$ and $p41$ are conductive, in each case, during the positive half of the voltage wave only. When now the auxiliary thyristor(s) $p32$ and/or $p42$ is-/are ignited by an impulse, then they will remain conductive for the remaining part of the half-period and will supply the necessary ignition currents for the main thyristors, by way of the resistors $r36$ and $r46$.

Compensation for temperature and voltage for the press is also a feature.

A semi-conductor resistance which has been built into the spindle nut of the press, and which has a negative temperature coefficient of $rNTC$ has been placed parallel to the resistance $r2o31$. When the temperature within the spindle nut rises, the resistance of $rNTC$ decreases, so that the parallel conductance to $p21$ will increase, whereby the control angle will be reduced while the input signal remains the same. Accordingly, the higher efficiency of the warm press will be compensated by the temperature-dependent reduction of the control angle. Transistor $p51$ and breakdown diode $n51$ are used for voltage compensation. $p51$ is parallel to $r203$ and reduces that resistance, in the case of normal power-supply voltage, by a certain amount. When the power-supply voltage increases, transistor $p51$ will be blocked, dependening on the extent of the potential rise; on the other hand, when the main-power supply voltage decreases, the transistor will be actuated further, accordingly. That means that the resistance value of the parallel connection from $p51$ and $r203$ changes, in dependence on the power-supply voltage, and that in turn has the consequence that the control angle is enlarged in the case of low power-supply voltage and reduced in the case of high power-supply voltage.

The invention in its broader aspects is not limited to the specific detail shown and described, and departures may be made from such details without departing from the principles of the invention and without sacrificing its chief advantages.

What is claimed is:

1 In a fast spindle type impact press comprising a motor having an elongated motor shaft defining the spindle of the impact press and being capable of withstanding impact forces, a set of main motor windings for controlling the basic motor operation, and a retarding winding for braking the motor, a motor control system comprising: first thyristor means associated with said main motor windings for developing motor action in a first sense when conductive; second thyristor means associated with said main motor windings for developing motor action in a second and opposite sense when conductive; said first and second thyristor means serving to connect their respective main motor winding to a main supply when conductive; rectifier bridge means associated with said retarding winding for braking the motor when conductive; and means for controlling the conductivity of said thyristor means and said bridge rectifier means for enabling the motor to be driven at torques in excess of those corresponding to the desired impact forces, for enabling the torque of the motor to be reduced before impact, and hence for adjusting the motor driving and retarding torques so as to develop precise impact forces at predetermined and small interval impact times.

2. The motor control system recited in claim 1, wherein said motor driving and retarding torques for each impact within a single pressing cycle are independently adjustable by a preset program.

3. The motor control system set forth in claim 1, and further comprising means for stabilizing the operation of said thyristor notwithstanding changes in environmental conditions.

4. The motor control system set forth in claim 3, wherein said controlling means compensates for changes in temperature and voltage.

5. The motor control system set forth in claim 1, and further comprising switch means positioned and associated with respect to said impact press for controlling and switching said thyristor means and said bridge rectifier means at predetermined instants during the stroke of said impact press.

6. The motor control system recited in claim 1, and further comprising program means for sequencing the operation of said thyristor means and said rectifier means of the system.

7. The motor control system of claim 1, wherein said motor is positioned immediately above its impact press and is coupled directly to the spindle thereof.

8. In a method for controlling the operation of a fast spindle type impact press comprising a motor with an elongated shaft defining the spindle of the impact press and associating with the ram thereof, the steps of: actuating thyristor means associating with a set of main motor windings to accelerate the ram of the impact press by developing motor action in a first sense at a speed greater than is necessary to develop the desired impact force; and actuating a rectifier bridge associating with a motor retarding winding to retard the ram of the impact press by diminishing the speed of the motor to the speed necessary to develop the desired impact force.

9. The method set forth in claim 8, and further comprising the step of independently adjusting the motor driving and retarding torques by a preset program.

10. The method recited in claim 9, and further comprising the step of sequencing the operation of said thyristor means and said rectifier means by a preset program.

11. The method recited in claim 8, and further comprising the step of switching said thyristor means and said bridge rectifier means at predetermined instants.

* * * * *